(12) United States Patent
Waldron et al.

(10) Patent No.: US 7,908,765 B2
(45) Date of Patent: Mar. 22, 2011

(54) CONTINUOUS GRANULATING AND DRYING APPARATUS

(75) Inventors: Michel Simon Waldron, Southampton (GB); Trevor Gordon Page, Southampton (GB)

(73) Assignee: Collette NV, Wommelgem (BE)

( * ) Notice: Subject to any disclaimer, the term of this patent is extended or adjusted under 35 U.S.C. 154(b) by 584 days.

(21) Appl. No.: 11/615,705

(22) Filed: Dec. 22, 2006

(65) Prior Publication Data

US 2008/0148594 A1     Jun. 26, 2008

(51) Int. Cl.
 *F26B 11/02* (2006.01)
(52) U.S. Cl. .............. 34/138; 34/171; 34/181; 34/212; 422/140; 264/117; 264/118; 71/8; 425/222; 510/444
(58) Field of Classification Search ............ 34/384, 34/401, 576, 585, 92, 138, 171, 212, 181; 422/140; 510/444; 264/117, 118; 71/8; 425/222

See application file for complete search history.

(56) References Cited

U.S. PATENT DOCUMENTS

| | | | | |
|---|---|---|---|---|
| 3,161,483 A * | 12/1964 | Morris | | 34/580 |
| 3,218,729 A * | 11/1965 | Micklich | | 34/371 |
| 3,241,246 A * | 3/1966 | Pollock | | 34/368 |
| 3,384,972 A * | 5/1968 | Oxley | | 34/338 |
| 3,394,468 A * | 7/1968 | Zeller | | 34/583 |
| 3,425,135 A * | 2/1969 | Langsetmo et al. | | 34/312 |
| 3,475,832 A * | 11/1969 | Kuelling | | 34/182 |
| 3,490,355 A * | 1/1970 | Groth et al. | | 426/473 |
| 3,600,818 A * | 8/1971 | Lang et al. | | 34/372 |
| 3,660,908 A * | 5/1972 | Bardot | | 34/313 |
| 3,773,922 A * | 11/1973 | Gergely | | 424/44 |
| 3,775,863 A * | 12/1973 | Updegrove | | 34/166 |
| 3,800,508 A * | 4/1974 | Zenz | | 95/276 |
| 3,805,401 A * | 4/1974 | Fontein | | 34/371 |
| 3,815,255 A * | 6/1974 | Yamato | | 34/580 |
| 3,818,846 A * | 6/1974 | Reese | | 110/187 |
| 3,885,049 A * | 5/1975 | Taylor | | 426/18 |
| 3,896,557 A * | 7/1975 | Seitzer et al. | | 34/371 |
| 3,913,238 A * | 10/1975 | Updegrove | | 34/380 |
| 3,935,298 A * | 1/1976 | Sugahara et al. | | 423/320 |
| 4,022,580 A * | 5/1977 | Rush | | 422/211 |
| 4,035,151 A * | 7/1977 | Czerny et al. | | 422/232 |
| 4,070,765 A * | 1/1978 | Hovmand et al. | | 34/371 |
| 4,082,532 A * | 4/1978 | Imhof | | 71/8 |
| 4,115,927 A * | 9/1978 | Rosensweig | | 34/249 |
| 4,136,016 A * | 1/1979 | Rosensweig | | 208/134 |
| 4,157,245 A * | 6/1979 | Mitchell et al. | | 48/197 R |
| 4,188,184 A * | 2/1980 | Fornoni | | 432/13 |
| 4,190,963 A * | 3/1980 | Christensen et al. | | 34/585 |

(Continued)

FOREIGN PATENT DOCUMENTS

DE       4128258 A1 *   2/1993

(Continued)

*Primary Examiner* — Stephen M. Gravini
(74) *Attorney, Agent, or Firm* — Sughrue Mion, PLLC

(57) ABSTRACT

A continuous granulating and drying apparatus comprises a granulator and a fluid bed dryer. The fluid bed dryer comprises at least two separate processing compartments forming part of a common vessel being provided with radially extending partition walls separating the processing compartments from each other. Each processing compartment has a product inlet and a product outlet. The fluid bed dryer comprises a granulated product supply conduit arranged rotatably to selectively communicate with the product inlet of each separate processing compartment, respectively, and a product discharge conduit arranged rotatably to selectively communicate with the product outlet of each separate processing compartment, respectively. The granulator and the fluid bed dryer are closely coupled.

16 Claims, 9 Drawing Sheets

U.S. PATENT DOCUMENTS

| | | | | |
|---|---|---|---|---|
| 4,229,886 A * | 10/1980 | Durant | | 34/92 |
| 4,296,080 A * | 10/1981 | Rosensweig | | 423/244.06 |
| 4,307,773 A * | 12/1981 | Smith | | 165/104.16 |
| 4,354,450 A * | 10/1982 | Nagahama et al. | | 118/303 |
| 4,358,901 A * | 11/1982 | Takabatake et al. | | 34/591 |
| RE31,439 E * | 11/1983 | Rosensweig | | 34/249 |
| 4,481,721 A * | 11/1984 | Graff | | 34/500 |
| 4,489,504 A * | 12/1984 | Hammer | | 34/362 |
| 4,501,773 A * | 2/1985 | Nioh et al. | | 427/213 |
| 4,532,155 A * | 7/1985 | Golant et al. | | 427/213 |
| 4,543,733 A * | 10/1985 | Siegell et al. | | 34/249 |
| 4,556,175 A * | 12/1985 | Motoyama et al. | | 241/57 |
| 4,561,192 A * | 12/1985 | Meade | | 34/359 |
| 4,578,879 A * | 4/1986 | Yokoyama et al. | | 34/582 |
| 4,591,324 A * | 5/1986 | Kubota | | 425/222 |
| 4,619,052 A * | 10/1986 | Osburn et al. | | 34/368 |
| 4,621,437 A * | 11/1986 | Grande et al. | | 34/361 |
| 4,623,098 A * | 11/1986 | Motoyama et al. | | 241/46.04 |
| 4,657,767 A * | 4/1987 | Meade | | 426/471 |
| 4,663,859 A * | 5/1987 | Hinson et al. | | 34/368 |
| 4,876,802 A * | 10/1989 | Gergely et al. | | 34/408 |
| 4,967,486 A * | 11/1990 | Doelling | | 34/259 |
| 4,967,688 A * | 11/1990 | Funakoshi et al. | | 118/303 |
| 5,044,093 A * | 9/1991 | Itoh et al. | | 34/585 |
| 5,090,134 A * | 2/1992 | Russemeyer et al. | | 34/589 |
| 5,092,960 A * | 3/1992 | Brown | | 159/48.1 |
| 5,119,570 A * | 6/1992 | Russemeyer et al. | | 34/363 |
| 5,149,398 A * | 9/1992 | Shaffer et al. | | 159/4.01 |
| 5,233,765 A * | 8/1993 | Schaarschmidt | | 34/394 |
| 5,343,631 A * | 9/1994 | Shackelford et al. | | 34/370 |
| 5,351,103 A * | 9/1994 | Komatsu et al. | | 396/630 |
| 5,355,590 A * | 10/1994 | Slangen et al. | | 34/385 |
| 5,361,513 A * | 11/1994 | Woessner | | 34/363 |
| 5,400,105 A * | 3/1995 | Koboshi et al. | | 396/632 |
| 5,452,045 A * | 9/1995 | Koboshi et al. | | 396/626 |
| 5,460,926 A * | 10/1995 | Komatsu et al. | | 430/401 |
| 5,480,617 A * | 1/1996 | Uhlemann et al. | | 422/140 |
| 5,544,426 A * | 8/1996 | Yoshida et al. | | 34/314 |
| 5,544,427 A * | 8/1996 | Raehse et al. | | 34/372 |
| 5,552,568 A * | 9/1996 | Koboshi et al. | | 396/568 |
| 5,615,493 A * | 4/1997 | Funder | | 34/583 |
| 5,632,102 A * | 5/1997 | Luy et al. | | 34/582 |
| 5,776,855 A * | 7/1998 | Schapira et al. | | 504/116.1 |
| 5,780,211 A * | 7/1998 | Komatsu et al. | | 430/465 |
| 5,867,921 A * | 2/1999 | Maruyama et al. | | 34/578 |
| 5,946,818 A * | 9/1999 | Baxter et al. | | 34/379 |
| 5,950,325 A * | 9/1999 | Mehdizadeh et al. | | 34/256 |
| 6,063,751 A * | 5/2000 | France et al. | | 510/444 |
| 6,092,302 A * | 7/2000 | Berrigan | | 34/303 |
| 6,143,221 A * | 11/2000 | Gurol | | 264/118 |
| 6,148,540 A * | 11/2000 | Ohmura et al. | | 34/360 |
| 6,159,252 A * | 12/2000 | Schutte et al. | | 23/313 FB |
| 6,203,730 B1 * | 3/2001 | Honda et al. | | 264/7 |
| 6,253,465 B1 * | 7/2001 | Ichitani et al. | | 34/565 |
| 6,270,708 B1 * | 8/2001 | Gurol | | 264/117 |
| 6,290,775 B1 * | 9/2001 | Kohlen et al. | | 118/303 |
| 6,364,948 B1 * | 4/2002 | Austin et al. | | 118/58 |
| 6,438,867 B1 * | 8/2002 | Teich et al. | | 34/470 |
| 6,516,537 B1 * | 2/2003 | Teich et al. | | 34/340 |
| 6,591,515 B2 * | 7/2003 | Kinard et al. | | 34/92 |
| 6,769,200 B2 * | 8/2004 | Raehse et al. | | 34/372 |
| 6,892,475 B2 * | 5/2005 | Wakamatsu et al. | | 34/576 |
| 7,297,314 B2 * | 11/2007 | Natsuyama et al. | | 422/139 |
| 2001/0047594 A1 * | 12/2001 | Marcheschi | | 34/401 |
| 2002/0056206 A1 * | 5/2002 | Pace et al. | | 34/372 |
| 2003/0046824 A1 * | 3/2003 | Kinard et al. | | 34/92 |
| 2004/0000069 A1 * | 1/2004 | Gurol | | 34/592 |
| 2004/0168342 A1 * | 9/2004 | Wakamatsu et al. | | 34/576 |
| 2004/0228978 A1 * | 11/2004 | Jacob et al. | | 427/430.1 |
| 2006/0112588 A1 * | 6/2006 | Ness et al. | | 34/513 |
| 2007/0137062 A1 * | 6/2007 | Eck | | 34/360 |
| 2007/0234586 A1 * | 10/2007 | Huettlin | | 34/77 |
| 2008/0047160 A1 * | 2/2008 | Iglesias Vives | | 34/266 |
| 2008/0060213 A1 * | 3/2008 | Gehrmann et al. | | 34/284 |
| 2008/0105019 A1 * | 5/2008 | Carin et al. | | 71/15 |
| 2008/0148594 A1 * | 6/2008 | Waldron et al. | | 34/384 |
| 2008/0201980 A1 * | 8/2008 | Bullinger et al. | | 34/493 |
| 2008/0260596 A1 * | 10/2008 | Bouman | | 422/143 |
| 2009/0000184 A1 * | 1/2009 | Garwood | | 44/307 |
| 2009/0077826 A1 * | 3/2009 | Pfeffer et al. | | 34/282 |
| 2010/0011610 A1 * | 1/2010 | Bittorf et al. | | 34/359 |
| 2010/0068596 A1 * | 3/2010 | Nozue et al. | | 429/34 |
| 2010/0098995 A1 * | 4/2010 | Obuse et al. | | 429/33 |
| 2010/0249320 A1 * | 9/2010 | Matsumoto et al. | | 524/832 |

FOREIGN PATENT DOCUMENTS

| | | | |
|---|---|---|---|
| DE | 19850087 A1 * | 5/1999 | |
| EP | 0289074 A1 | 11/1988 | |
| EP | 419992 A2 * | 4/1991 | |
| EP | 491638 A2 * | 6/1992 | |
| EP | 0770423 A2 | 5/1997 | |
| GB | 698374 | 10/1953 | |
| GB | 1164026 | 9/1969 | |
| GB | 2003396 A * | 3/1979 | |
| JP | 57203009 A * | 12/1982 | |
| JP | 58148307 A * | 9/1983 | |
| JP | 61230730 A * | 10/1986 | |
| JP | 01176455 A * | 7/1989 | |
| JP | 01296939 A * | 11/1989 | |
| JP | 03267139 A * | 11/1991 | |
| JP | 07060261 A * | 3/1995 | |
| JP | 09002811 A * | 1/1997 | |
| JP | 2003126680 A * | 5/2003 | |
| JP | 2007196931 A * | 8/2007 | |
| WO | WO 9300991 A1 * | 1/1993 | |
| WO | 00/17549 A2 | 3/2000 | |
| WO | 2006/067544 A1 | 6/2006 | |

* cited by examiner

CONTINUOUS GRANULATING AND DRYING APPARATUS

BACKGROUND OF THE INVENTION

The present invention relates to a continuous granulating and drying apparatus for pharmaceutical products, comprising a granulator and a fluid bed dryer, the granulator comprising a longitudinal granulation chamber having a first end with an inlet for powder material and a binder feed port and a second end with an outlet for granulated product, the granulation chamber comprising at least one rotary shaft provided with at least one granulating element, the fluid bed dryer comprising at least two separate processing compartments forming part of a common vessel being provided with radially extending partition walls separating the processing compartments from each other, each processing compartment having a product inlet and a product outlet, the fluid bed dryer comprising a bed plate having openings for fluidizing gas and being arranged above a gas inlet, a gas outlet, a granulated product supply conduit arranged rotatably to selectively communicate with the product inlet of each separate processing compartment, respectively, a product discharge conduit arranged rotatably to selectively communicate with the product outlet of each separate processing compartment, respectively.

SUMMARY OF THE INVENTION

An object of the present invention is to provide a continuous granulating and drying apparatus, whereby product conveyance from granulator to dryer is facilitated.

In view of this object, the granulator and the fluid bed dryer are closely coupled.

In this way, a higher maximum rate of transfer of granulated product may be achieved. Further, modification of the granule structure during transfer is reduced. In addition, a smaller overall equipment footprint and thereby a smaller cleaning envelope is achieved.

In an embodiment, the outlet for granulated product of the granulation chamber has a substantially larger cross-sectional dimension than the granulated product supply conduit of the fluid bed dryer, the outlet for granulated product is coupled to the granulated product supply conduit by means of a transition piece comprising a housing having an inlet end mating the outlet for granulated product and an outlet end mating the product supply conduit, the housing is provided with a flexible liner having a first end and a second end that has a substantially smaller cross-sectional dimension than the first end, the circumference of the flexible liner being connected in a fluid tight manner with the housing at each end of the flexible liner, so that an annular enclosure is formed between the flexible liner and the housing, and the annular enclosure communicates with a control fluid connection. Thereby, the form of the flexible liner may be repeatedly changed by changing the fluid pressure in the annular enclosure, whereby powder or granular material building up on the walls of the flexible liner will loosen. The fluid pressure in the annular enclosure may be varied by means of the control fluid connection. Because the second end of the flexible liner has a substantially smaller cross-sectional dimension than the first end, the flexible liner narrows the stream of powder or granular material substantially without causing the material to clog up. By narrowing the stream of material, the flow velocity is increased substantially, whereby the granular material is easily transported through the rotatably arranged granulated product supply conduit of the fluid bed dryer without clogging up.

In an embodiment, the outlet for granulated product of the granulation chamber is arranged above the granulated product supply conduit of the fluid bed dryer.

In an embodiment, the rotatably arranged granulated product supply conduit of the fluid bed dryer comprises a housing having an inlet end and an outlet end, the housing is provided with a flexible liner having a first end and a second end, the circumference of the flexible liner being connected in a fluid tight manner with the housing at each end of the flexible liner, so that an annular enclosure is formed between the flexible liner and the housing, and the annular enclosure communicates with a control fluid connection. Thereby, the form of the flexible liner may be repeatedly changed by changing the fluid pressure in the annular enclosure, whereby powder or granular material building up on the walls of the flexible liner will loosen. Consequently, it is avoided that the material clogs up when passing through the granulated product supply conduit.

In a structurally advantageous embodiment, the second end of the flexible liner has a substantially smaller cross-sectional dimension than the first end of the flexible liner.

In an embodiment, the granulated product supply conduit of the fluid bed dryer is a rigid tube having a substantially constant cross-sectional dimension corresponding substantially to a cross-sectional dimension of the outlet for granulated product of the granulation chamber. Thereby, the cross-sectional dimension of the pathway for the material from the outlet of the granulation chamber to the outlet of the granulated product supply conduit of the fluid bed dryer is not narrowed, and thereby the risk of material clogging up is minimized.

In an embodiment, the distance between the rotatably arranged granulated product supply conduit of the fluid bed dryer and the outlet for granulated product of the granulation chamber is smaller than one meter.

In an embodiment, the distance between the rotatably arranged granulated product supply conduit of the fluid bed dryer and the outlet for granulated product of the granulation chamber is smaller than half a meter.

In an embodiment, the outlet for granulated product of the granulation chamber is coupled to the granulated product supply conduit of the fluid bed dryer by means of a sonic conditioner comprising a granulated product pathway provided with a generator of airwaves traveling at sonic speed. Thereby, the airwaves traveling at sonic speed will condition the material passing through the sonic conditioner in such a way that the risk of clogging up in the granulated product supply conduit is minimized.

In a structurally advantageous embodiment, the sonic conditioner is rigidly connected with the outlet for granulated product of the granulation chamber and rotatably connected with the granulated product supply conduit of the fluid bed dryer.

In a structurally advantageous embodiment, the granulated product supply conduit of the fluid bed dryer has the form of a sonic conditioner comprising a granulated product pathway provided with a generator of airwaves traveling at sonic speed.

In an embodiment, a pressure controlling supply fan is connected to the gas inlet of the fluid bed dryer. Thereby, a pressure close to atmospheric may be maintained in the processing compartments of the fluid bed dryer, whereby it may be avoided that the granulator and the feed systems are adversely affected by a too large pressure drop from the granulation chamber to the fluid bed dryer.

In an embodiment, the at least one rotary shaft of the granulator forms an angle of from 0 to 70 degrees with the vertical.

In an embodiment, the at least one rotary shaft of the granulator forms an angle of from 0 to 70 degrees with the horizontal.

In an embodiment, the granulation chamber comprises at least two parallel rotary shafts provided with granulating elements.

In an embodiment, the product discharge conduit and the granulated product supply conduit of the fluid bed dryer are rotatable independently by means of two separate motors, so that the product discharge conduit and the granulated product supply conduit may communicate with different processing compartments independently of each other. Thereby, more flexibility with regard to the control of the supply of product to and the discharge of product from the separate processing compartments of the fluid bed dryer may be achieved.

The invention further relates to a method of continuous granulation and drying of pharmaceutical products in the form of powder material, whereby material and binder are fed into a first end of a longitudinal granulation chamber, the material is granulated by means of at least one granulating element provided on at least one rotating shaft extending from the first end to the second end in the granulation chamber, granulated product is discharged from a second end of the granulation chamber and guided directly through a granulated product supply conduit into a processing compartment of a fluid bed dryer, the fluid bed dryer comprising at least two separate processing compartments forming part of a common vessel being provided with radially extending partition walls separating the processing compartments from each other, whereby the granulated product supply conduit is rotated intermittently to selectively communicate with each separate processing compartment so that the processing compartments of the fluid bed dryer are filled with granulated product, one by one in any appropriate order, and whereby the processing compartments, after drying of the granulated product, are emptied one by one in any appropriate order, through a product discharge conduit that is rotated intermittently to selectively communicate with each separate processing compartment.

In an embodiment, granulated product discharged from the second end of the granulation chamber is guided, at least partly by means of conveying air, through a transition piece into the granulated product supply conduit, the granulated product is guided through a flexible liner of a housing of the transition piece, the flexible liner thereby narrowing the stream of granulated product substantially, and the form of the flexible liner is varied repeatedly by providing under pressure or overpressure in an enclosure formed between the flexible liner and the housing, so that granulated product sticking to the flexible liner is loosened.

In an embodiment, granulated product discharged from the second end of the granulation chamber falls, at least partly by means of gravity, directly through the granulated product supply conduit and into the processing compartment.

In an embodiment, the granulated product is guided through a flexible liner of a housing of the granulated product supply conduit, the flexible liner thereby narrowing the stream of granulated product substantially, and the form of the flexible liner is varied repeatedly by providing under pressure or overpressure in an enclosure formed between the flexible liner and the housing, so that granulated product sticking to the flexible liner is loosened.

In an embodiment, granulated product discharged from the second end of the granulation chamber falls through a sonic conditioner into the granulated product supply conduit, and the granulated product falls through a pathway of the sonic conditioner where airwaves traveling at sonic speed are generated.

In an embodiment, granulated product discharged from the second end of the granulation chamber travels a distance of not more than one meter before entering the granulated product supply conduit.

In an embodiment, granulated product discharged from the second end of the granulation chamber travels a distance of not more than half a meter before entering the granulated product supply conduit.

BRIEF DESCRIPTION OF THE DRAWINGS

The invention will now be explained in more detail below by means of examples of embodiments with reference to the very schematic drawing, in which.

DETAILED DESCRIPTION OF THE INVENTION

Figure 1:
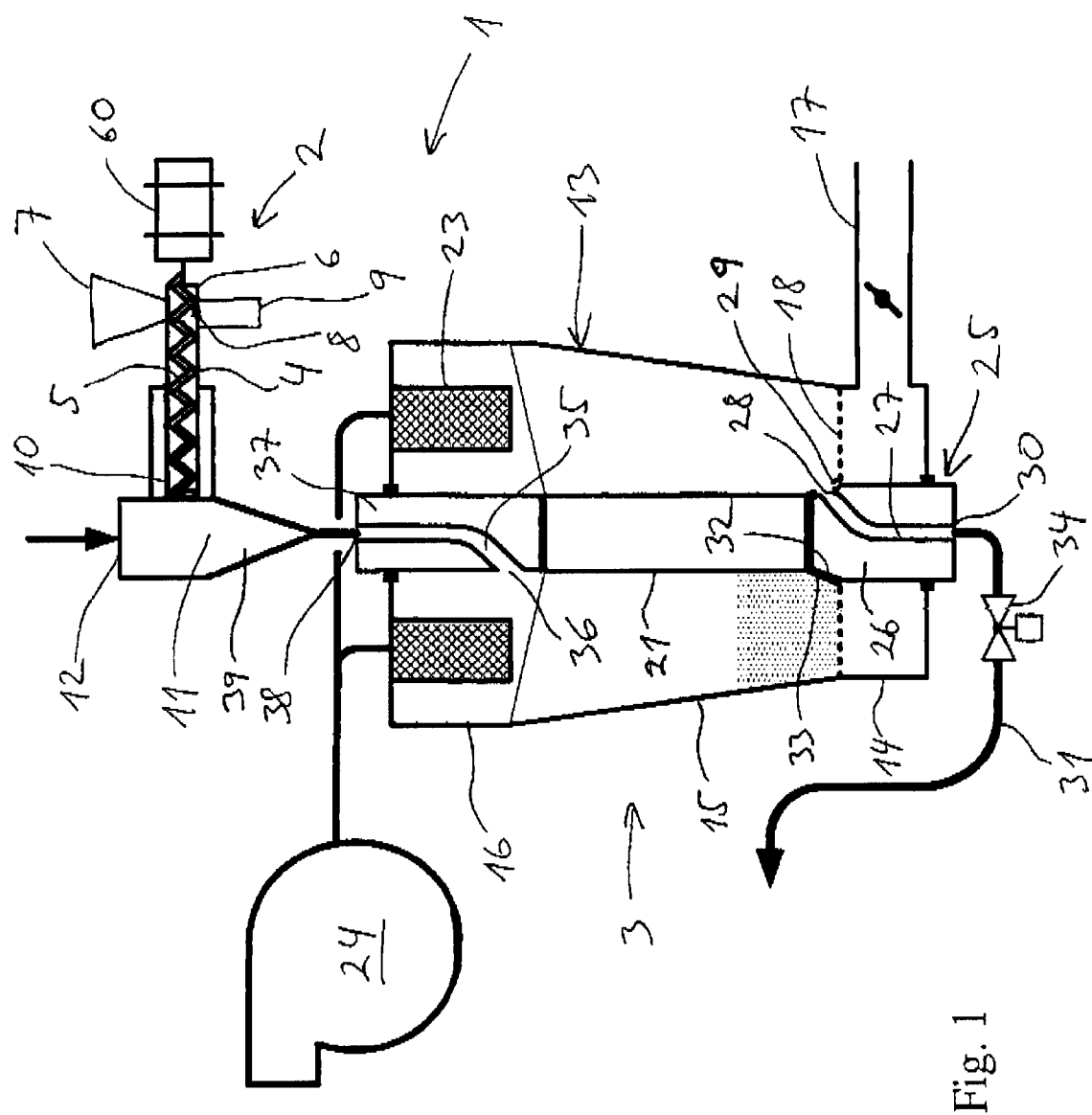
FIG. 1 shows in diagrammatic form a continuous granulating and drying apparatus according to the invention, comprising a horizontal screw granulator that is closely coupled to a fluid bed dryer.

FIG. 1 shows a continuous granulating and drying apparatus 1 for pharmaceutical products according to the invention, the apparatus comprising a horizontal screw granulator 2 that is closely coupled to a fluid bed dryer 3.

The screw granulator 2 comprises a longitudinal granulation chamber 4 in which two parallel rotary shafts, of which only one 5 is shown, are arranged. On each shaft 5 is arranged a plurality of granulating elements. However, any suitable number of shafts provided with granulating elements may be arranged in the granulation chamber 4 in any suitable way. In addition, the number of granulating elements on a shaft may be varied in order to obtain a desired performance of the screw granulator 2. The rotary shafts are journalled at each end in not shown bearings and driven by means of a drive unit 60. In the embodiment shown in FIG. 1, the screw granulator 2 is horizontally arranged; however, the granulation chamber 4 and the rotary shafts 5 may also be tilted by an angle with the horizontal, for instance by an angle of up to 70 degrees.

At a first end 6 of the granulation chamber 4 is arranged an inlet 7 in the form of a downwardly tapering funnel through which powder material may fall by means of gravity into the granulation chamber 4 at the first end 6. Two or more inlets may also be provided. In order to ensure a regular supply of the powder material to the granulation chamber 4, a not shown impeller may be arranged in the funnel on a vertical spindle driven by a not shown drive motor.

A binder feed port 8 is arranged through the wall of the granulation chamber 4 at the first end 6. A feed pump 9 is arranged immediately adjacent the granulation chamber communicating directly with the binder feed port 8. Additional binder feed ports and additional feed pumps may be arranged at the first end or along the granulation chamber. The feed pump 9 may work in a well-known manner. The feed pump is independently supplied with liquid, solution, suspension, gas, or any combination thereof.

At a second end 10 of the granulation chamber 4, an outlet 11 for granulated product is arranged. Opposite the outlet in relation to the granulation chamber 4, a transport air inlet 12 is arranged, whereby transport air may be drawn in the direction of the outlet diametrically across the second end 10 of the granulation chamber 4, thereby carrying granulated product from the granulation chamber to the outlet 11.

Figure 2:
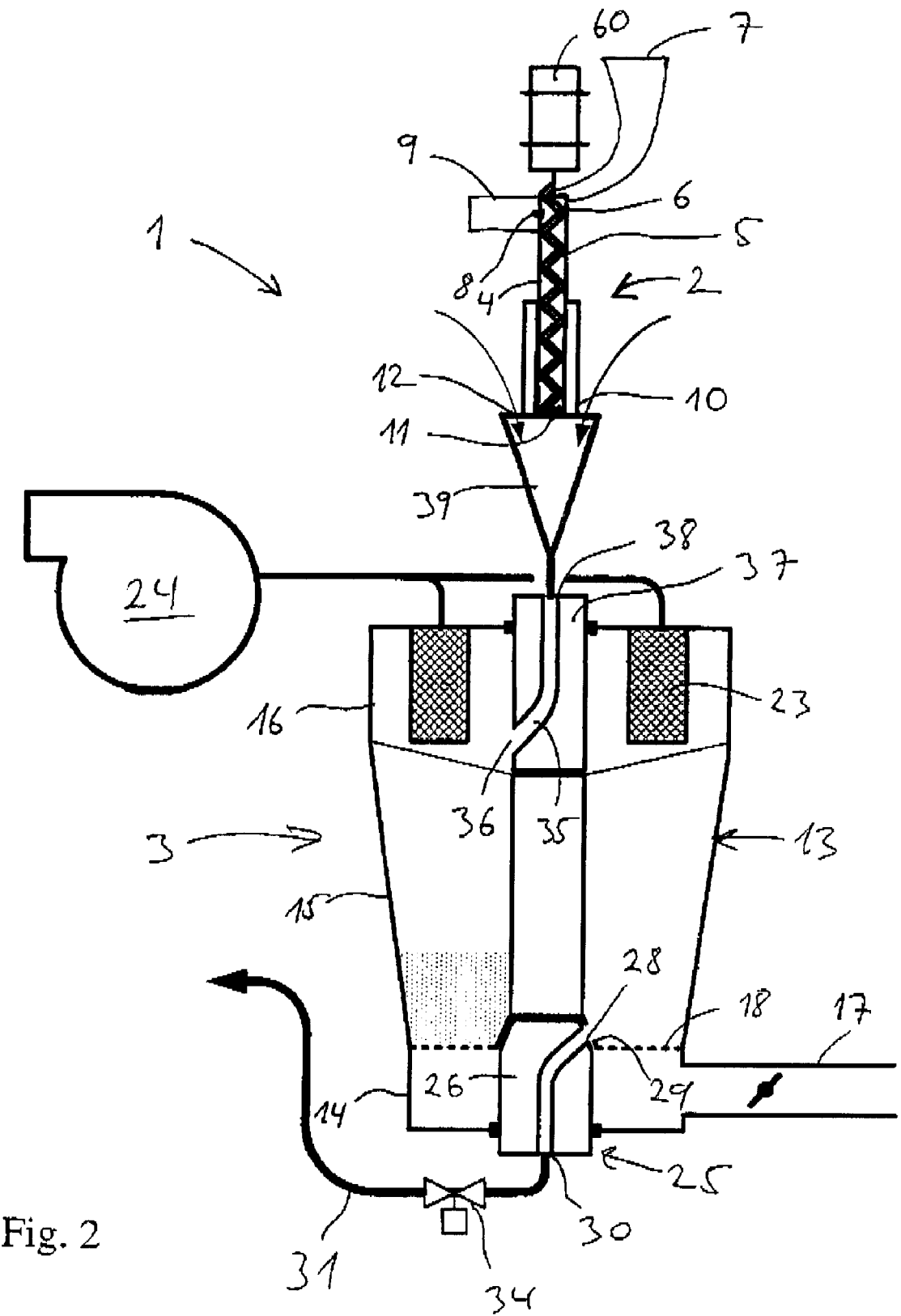
FIG. 2 shows an apparatus similar to that of FIG. 1, whereby the screw granulator is vertical.

FIG. 2 shows another embodiment of the continuous granulating and drying apparatus 1 according to the invention, whereby the apparatus comprises a vertical screw granulator 2 that is closely coupled to a fluid bed dryer 3. In this embodiment, the transport air inlet 12 is arranged around the outlet 11 of the granulation chamber 4, so that transport air may carry granulated product away from the outlet 11 in the direction of the fluid bed dryer 3. Due to the vertical arrangement of the granulation chamber 4 and the rotary shafts 5, the powder material advances downwardly through the granulation chamber 4 substantially as a result of the gravity. The granulation chamber 4 and the rotary shafts 5 may also be tilted by an angle with the vertical, for instance by an angle of up to 70 degrees. Different tilt angles will result in different capacities of the granulator. In the vertical arrangement of the screw granulator 2 shown in FIG. 2, the gravity will cause a relatively large capacity of the granulator, and by an inclination of the shafts of 70 degrees in relation to the vertical, the gravity will result in a relatively smaller capacity of the granulator. The tilt angle of the shafts may be adjustable manually or automatically.

Figure 8:
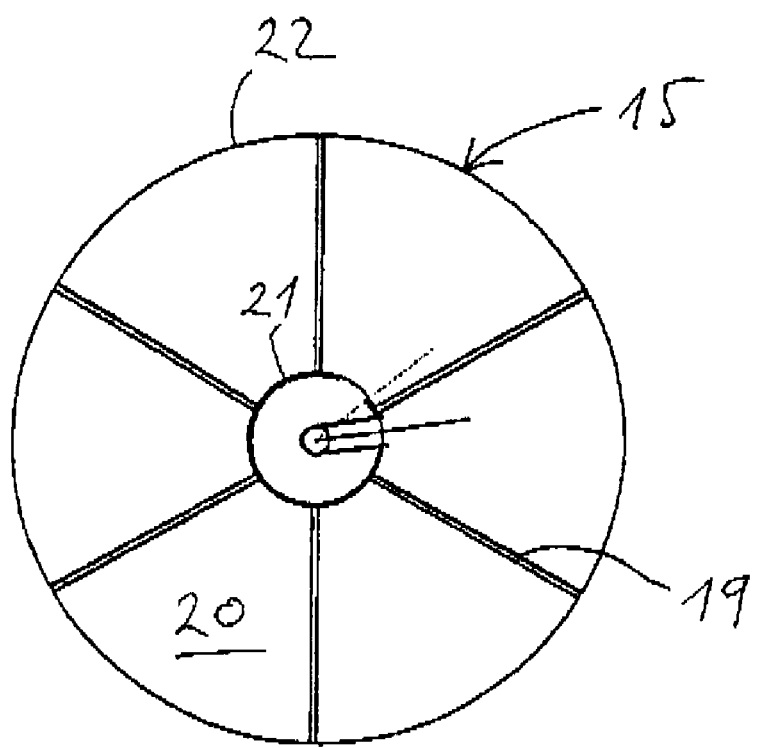
FIG. 8 is a diagrammatic top view of the fluid bed dryer of the continuous granulating and drying apparatus of FIGS. 1 to 5 and FIG. 9 is another embodiment of the apparatuses shown in FIGS. 1 and 2.

The fluid bed dryer 3 of the continuous granulating and drying apparatus 1 according to the invention comprises a housing 13 composed of a plenum chamber 14, on the top of which is mounted a processing chamber constituted by a common vessel 15 with a conical cross-section, and on the top of which is mounted a filter chamber 16. The plenum chamber 14 has an inlet 17 for fluidizing gas, and between the plenum chamber 14 and the common vessel 15 is arranged a bed plate 18 having openings for the passage of fluidizing gas. As illustrated in FIG. 8, the common vessel 15 is by means of partition walls 19 divided into six separate processing compartments 20. However, the common vessel 15 may be divided into any suitable number of separate processing compartments. The partition walls 19 extend radially from an inner wall 21 of the housing 13 to the outer wall 22 of the common vessel. At their lower edge, the partition walls 19 abut the bed plate 18.

The bed plate 18 may be manufactured from a single plate of sheet metal or composed of six plate sections corresponding to the six separate processing compartments 20, respectively. The bed plate or plate sections may be fabricated in a well-known manner by stamping several holes in the form of perforations in the plate so that each hole is associated with a gill portion, for example as described in EP 0 474 949 B1 (NIRO HOLDING A/S), EP 0 507 038 B1 (NIRO HOLDING A/S), or EP 0 876 203 B1 (NIRO A/S) and marketed as FLEX PLATE™, NON-SIFTING GILL PLATE™ and BUBBLE PLATE™, respectively. The not shown gill portions of the bed plate may be adapted to promote the transportation of product to the location of an outlet opening of each respective processing compartment arranged in the inner wall, which will be described in more detail below. The size and directions of the perforations may differ throughout the bed plate or sections thereof.

The filter chamber 16 is by means or a not shown flange connection connected to the common vessel 15 and comprises a number of filters 23 being arranged in a manner known per se for filtering the fluidizing gas before discharge by means of a fan 24. Furthermore, the common vessel 15 may by means of a not shown flange connection be connected to the plenum chamber 14, whereby a modular composition may be obtained. In addition, the inlet 17 of the plenum chamber 14 may by means of a flange connection be connected with a supply of fluidizing gas, such as a fan 67, see FIGS. 3 to 5. Thereby, the common vessel 15 and the plenum chamber 14 may, as a module, replace similar components of a fluidizing apparatus of a different design, for instance a conventional batch-type apparatus. The flange connections may be assembled by means of air cylinder driven clamping devices or similar suitable devices.

Referring to FIGS. 1 to 5 and 9, a plug valve 25 is arranged centrally in the plenum chamber 14 and has a plug 26 arranged rotatably coaxially with the common vessel 15. The plug 26 comprises a product discharge conduit 27 arranged rotatably with the plug 26 and having a first end opening 28 that by rotation of the plug 26 selectively may communicate with an outlet opening 29 of any one of the processing compartments 20. A second end opening 30 of the product discharge conduit 27 is rotatably connected with an outlet tube 31 arranged below the plug valve 25. A butterfly valve 34 is arranged in the outlet tube 31, whereby the product discharge may be regulated. However, other types of valve may be employed. The first end opening 28 of the product discharge conduit 27 is located in a conical section 32 of the plug 26, and the outlet opening 29 or each separate processing compartment is located in a conical section 33 of the inner wall 21 of the housing 13. The conical section 32 of the plug 26 fits substantially tightly into the conical section 33 of the inner wall 21. The conical sections 32, 33 ensure good performance in terms of tightness and friction.

Furthermore, the fluid bed dryer 3 has a rotatably arranged granulated product supply conduit 35 in the form of a pipe section having, at a first end, an opening 36 through which product may be supplied, directly from the supply conduit 35, selectively to each of the separate processing compartments 20, by rotating a cylindrical element 37 comprising the granulated product supply conduit 35, so that the opening 36 is located within the free space between two partition walls 19 delimiting the respective processing compartment 20 on either side. At a second end, the product supply conduit 35 has a rotational coupling 38.

The cylindrical element 37 comprising the granulated product supply conduit 35 and the plug 26 comprising the product discharge conduit 27 are rotatable independently by means of two separate not shown, drive motors, respectively. Thereby, good flexibility with regard to the control of the supply of product to and the discharge of product from the separate processing compartments may be achieved.

In the embodiments shown in FIGS. 1 and 2, the outlet 11 for granulated product of the granulation chamber 4 of the screw granulator 2 is closely coupled to the granulated product supply conduit 35 of the fluid bed dryer 3 by means of a transition piece 39 that is connected with the granulated product supply conduit 35 by means of the rotational coupling 38. Transport air may be drawn from the transport air inlet 12, through the transition piece 39 and the granulated product supply conduit 35, by maintaining the separate processing compartments at sub-atmospheric pressure.

Figure 6:
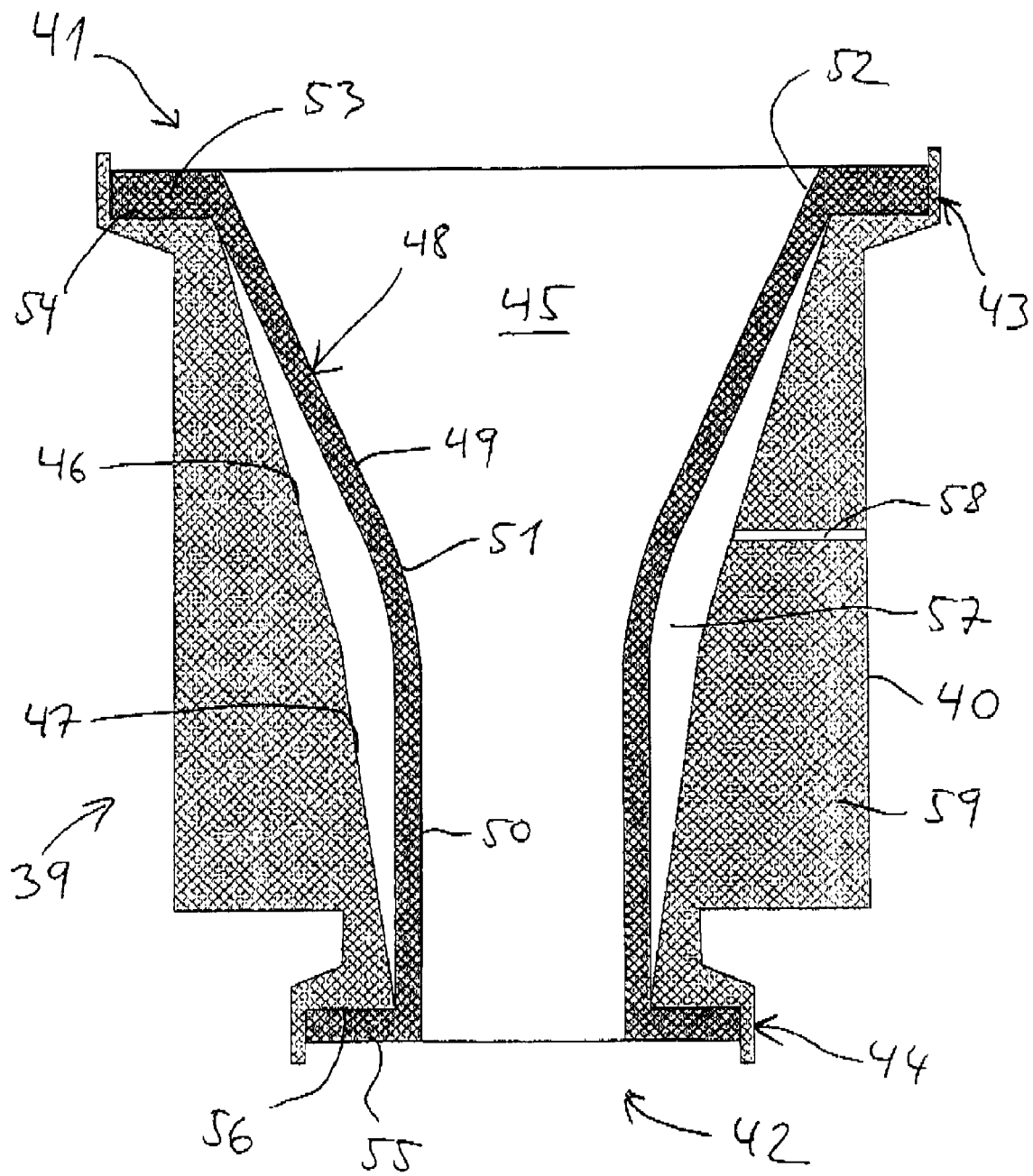
FIG. 6 shows an axial section through a transition piece of the apparatus shown in FIGS. 1 and 2.

FIG. 6 shows an axial cross-section through the transition piece 39 for the transfer of granular material. The transition piece comprises a substantially tubular housing 40 made of a rigid material, such as plastic or metal and having an inlet end 41 and an outlet end 42. The inlet end 41 has an inlet flange connection 43, and the outlet end has an outlet flange connection 44, whereby the diameter of the inlet flange connection is substantially larger than the diameter of the outlet flange connection. A passage 45 through the housing 40 from the inlet flange connection 43 to the outlet flange connection 44 is formed by means of a first conical section 46 and a second conical section 47, whereby the internal diameter of the housing 40 is decreased substantially from the inlet end 41 to the outlet end 42.

The passage 45 through the housing 40 is provided with a liner 48 made of a flexible material, such as silicone rubber, thereby forming a flexible passage through the transition piece 39. The flexible liner 48 is composed by a substantially conical section 49 and a substantially cylindrical section 50, so that a smaller end 51 of the conical section is forming a smooth transition with the cylindrical section 50. A larger end 52 of the conical section 49 is provided with a flange 53 abutting a flange surface 54 of the inlet flange connection 43 of the housing 40. When inlet flange connection 43 is connected with a not shown flange connection of the outlet 11 for granulated product of the granulation chamber 4 of the screw granulator 2, the flange of the liner will is sandwiched tightly between said not shown flange connection and the inlet flange connection 43. Opposite the transition with the conical section 49, the cylindrical section 50 is provided with a flange 55 abutting a flange surface 56 of the outlet flange connection 44 of the housing 40. When the outlet flange connection 44 is connected with a not shown flange connection of the rotational coupling 38 of the product supply conduit 35 of the fluid bed dryer 3, the flange 55 of the flexible liner 48 will be sandwiched tightly between said not shown flange connection and the outlet flange connection 44. In this way, the circumference of the flexible liner 48 is connected in a fluid tight manner with the housing 40 at each end of the flexible liner 48.

Between the housing 40 and the flexible liner 48, an annular enclosure 57 is formed in the passage 45. The flexible liner 48 is shown in its relaxed state, whereby the annular enclosure 57 forms a chamber having a volume greater than zero. The annular enclosure 57 is by means of a control fluid connection 58 through a wall 59 of the housing 40 connected with a not shown suction device and/or a pressurized fluid source. The control fluid may be any suitable kind of gas or liquid or a combination thereof. By changing the fluid pressure inside the annular enclosure 57 relative to the fluid pressure inside the flexible passage, the form of the flexible liner 48 may be changed, whereby material, such as possibly wet granules, built up on the inside of the flexible liner 48 in the flexible passage may be loosened. Furthermore, by regularly varying said fluid pressure, building-up of material on the flexible liner 48 may be substantially avoided.

The fluid pressure inside the annular enclosure 57 may be controlled by means of a control valve governed by means of a computer. The control valve may, for instance, be a solenoid valve having three positions for either closing the control fluid connection, connecting it with a suction device or connecting it with the surroundings. Thereby, for instance, it is possible to evacuate fluid from inside the annular enclosure 57 in order to deform the flexible liner 48 relative to its form shown in FIG. 6, maintain the obtained form during a period of time by closing the control fluid connection and subsequently allowing fluid to enter the annular enclosure from the surroundings in order for the flexible liner to obtain its form shown in FIG. 6 again or obtain an even more constricted form, if the fluid pressure inside the flexible passage is lower than the fluid pressure at the surroundings. If necessary, the flexible liner 48 may even be constricted to close the flexible passage.

Alternatively, the control valve may be adapted to connect the control fluid connection 58 with a not shown pressurized fluid source. The control valve may also be arranged to alternately connect the control fluid connection to the suction device and a not shown pressurized fluid source. In any case, the computer may be adapted to activate the control valve periodically, at regular or irregular intervals, or substantially continuously.

In another, not shown embodiment, the flexible liner may, in its relaxed state, fit the form of the passage, so that the annular enclosure forms a chamber having a volume equal zero. In that case, the control fluid connection may be connected to a not shown pressurized fluid source in order to change the form of the flexible liner, whereby material built tip on the inside of the flexible liner in the flexible passage may be loosened.

Alternatively to the control valve, the annular enclosure can be connected to a source of variable fluid pressure capable of applying suction or pressure and holding or varying that suction or pressure with time. Thereby, the annular chamber can also be vented to atmosphere. Alternatively to using a computer, also a very simple control system may be used, even a pneumatic system.

Figure 3:
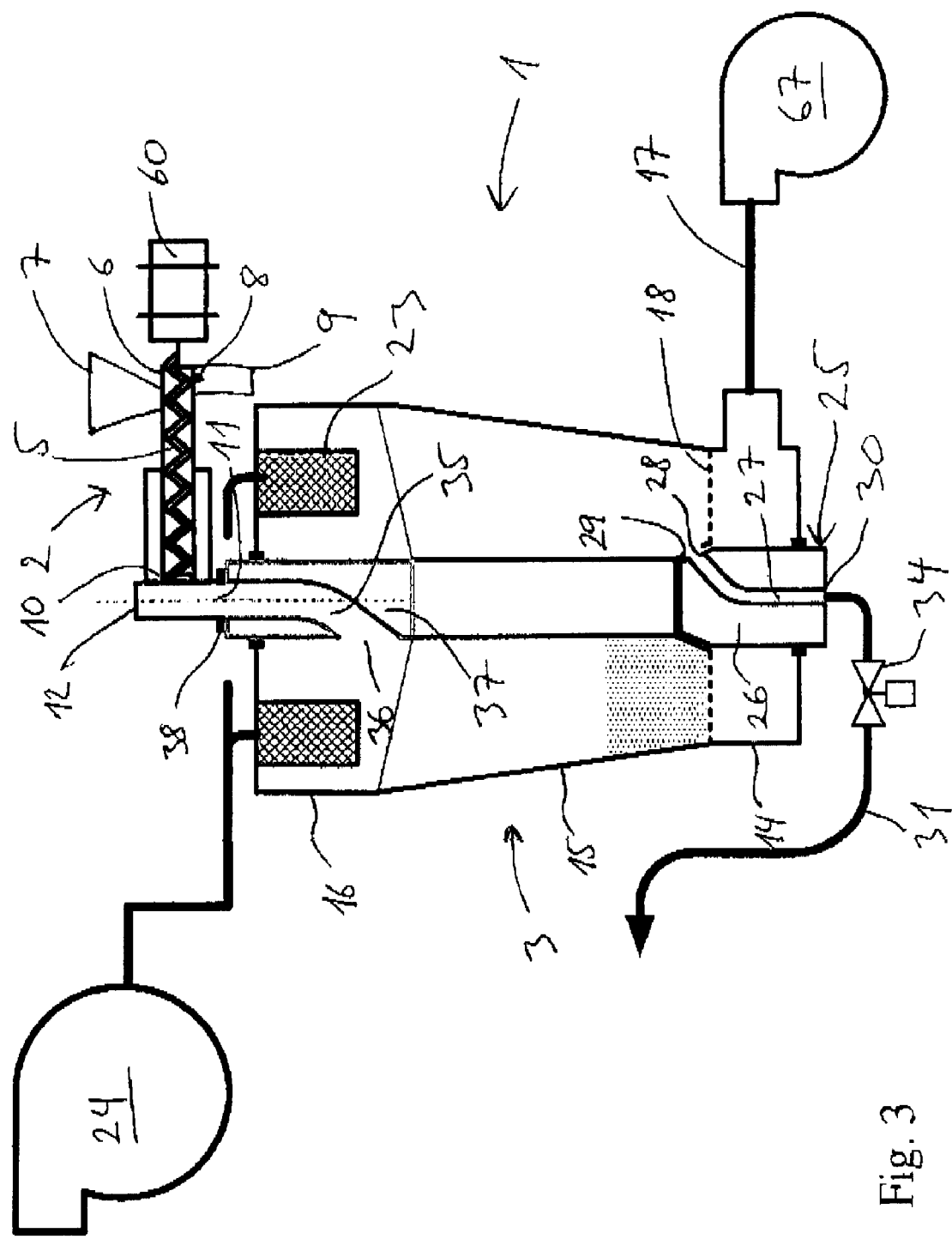
FIG. 3 to 5 show different embodiments of the apparatuses shown in FIGS. 1 and 2.
Figure 4:
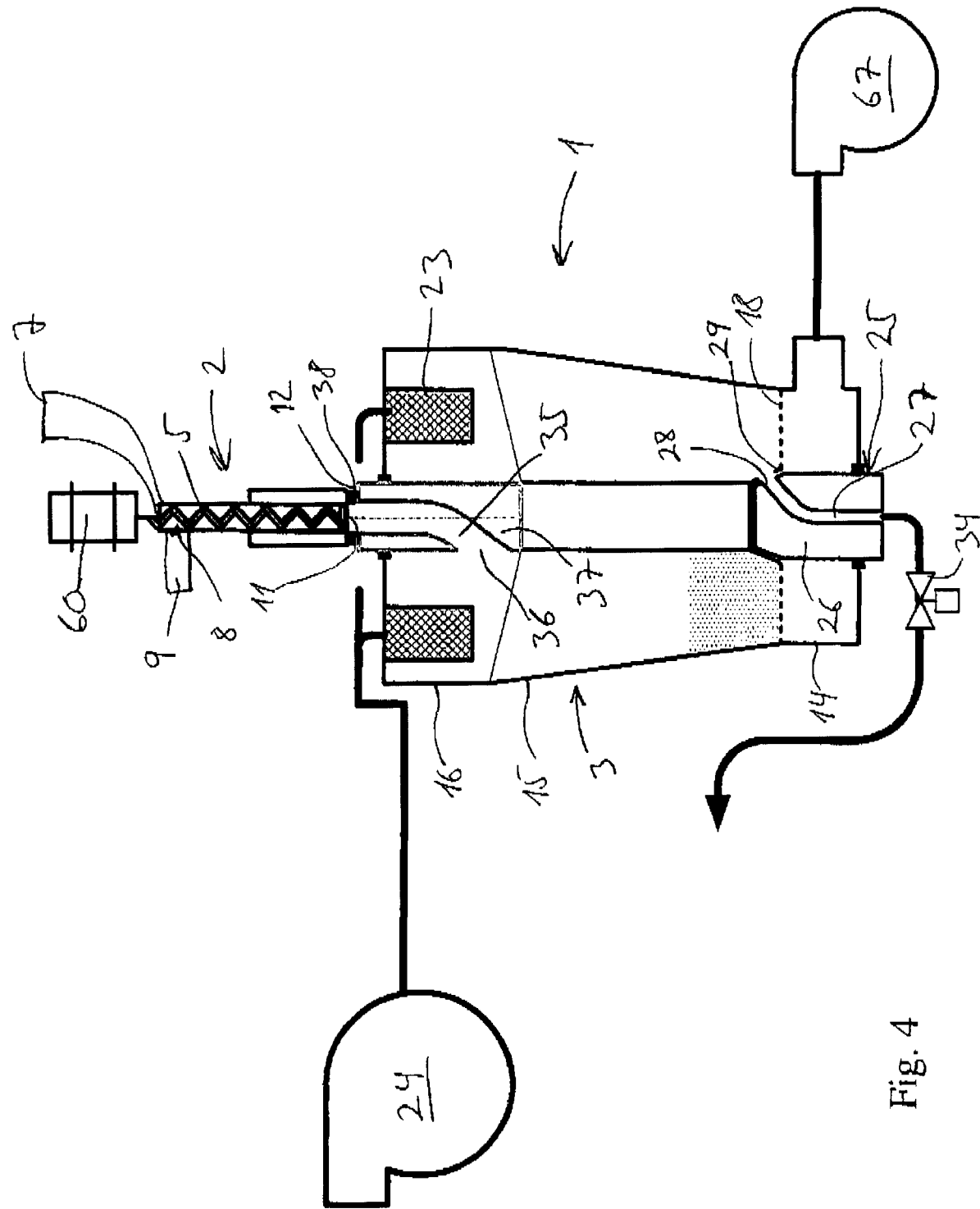

FIGS. 3 and 4 show embodiments corresponding to those of FIGS. 1 and 2, whereby the transition piece 39 has been omitted, and the outlet 11 for granulated product of the granulation chamber 4 of the screw granulator 2 is directly coupled to the granulated product supply conduit 35 of the fluid bed dryer 3 by means of the rotational coupling 38. In order to avoid product build-up in the granulated product supply conduit 35, the conduit 35 has been carried out as a rigid tube having a relatively large and substantially constant cross-sectional dimension corresponding substantially to a cross-sectional dimension of the outlet 11 for granulated product of the granulation chamber 4. As the cross-sectional dimension of the pathway for the material from the outlet of the granulation chamber to the outlet of the granulated product supply conduit of the fluid bed dryer is not narrowed, the risk of material clogging up is minimized. In this embodiment, a transport air inlet 12 may be arranged at the inlet of the granulated product supply conduit 35. However, with appropriate control of the pressure of the fluidizing as by means of the fan 67, so that the screw granulator is not affected adversely by a too large gas or air through flow, the transport air inlet 12 may be omitted. In that case, the transport of granulated product from the outlet of the granulation chamber to the outlet of the granulated product supply conduit of the fluid bed dryer may be performed substantially by gravity, and the pressure in the processing compartments of the fluid bed dryer may be maintained close to atmospheric pressure.

Figure 7:
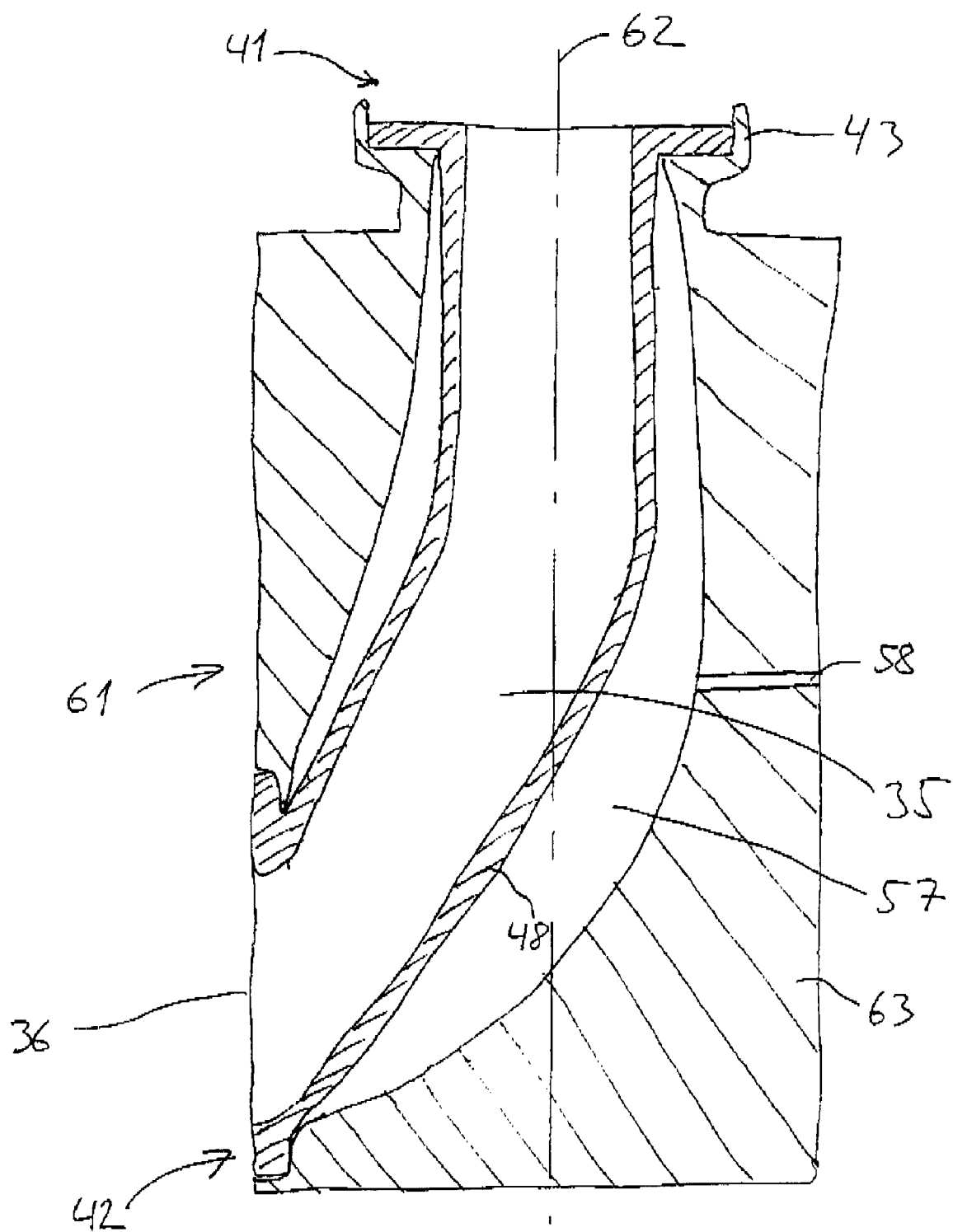
FIG. 7 shows an axial section through a granulated product supply conduit arranged rotatably and provided with a flexible liner.

In the embodiments shown in FIGS. 3 and 4, the granulated product supply conduit 35 of the fluid bed dryer 3 may alternatively be carried out as a rotary transition piece 61, as shown in FIG. 7, having a housing 63 with a rotational axis 62. Like the transition piece shown in FIG. 6, the rotary transition piece 61 of FIG. 7 has an inlet end 41 with an inlet flange connection 43 and an outlet end 42. However, the outlet end 42 has no flange connection, but opens out laterally in relation to the rotational axis 62. Furthermore, in the shown embodiment, the diameter of the inlet flange connection is substantially the same as the diameter of the outlet flange connection, but it may be larger. The inlet flange connection 43 is by means of the rotational coupling 38 (only indicated in FIGS. 3 and 4) connected to the outlet 11 of the granulation chamber 4.

The passage through the housing 63 is provided with a liner 48 made of a flexible material, such as silicone rubber, thereby forming a flexible passage through the rotary transition piece 61. Between the housing 63 and the flexible liner 48, an annular enclosure 57 is formed. The annular enclosure 57 is by means of a control fluid connection 58 through the housing 63 connected with a not shown suction device and/or a pressurized fluid source. The rotary transition piece 61 functions substantially in the same way as the transition piece 39 shown in FIG. 6 and described above.

Figure 5:
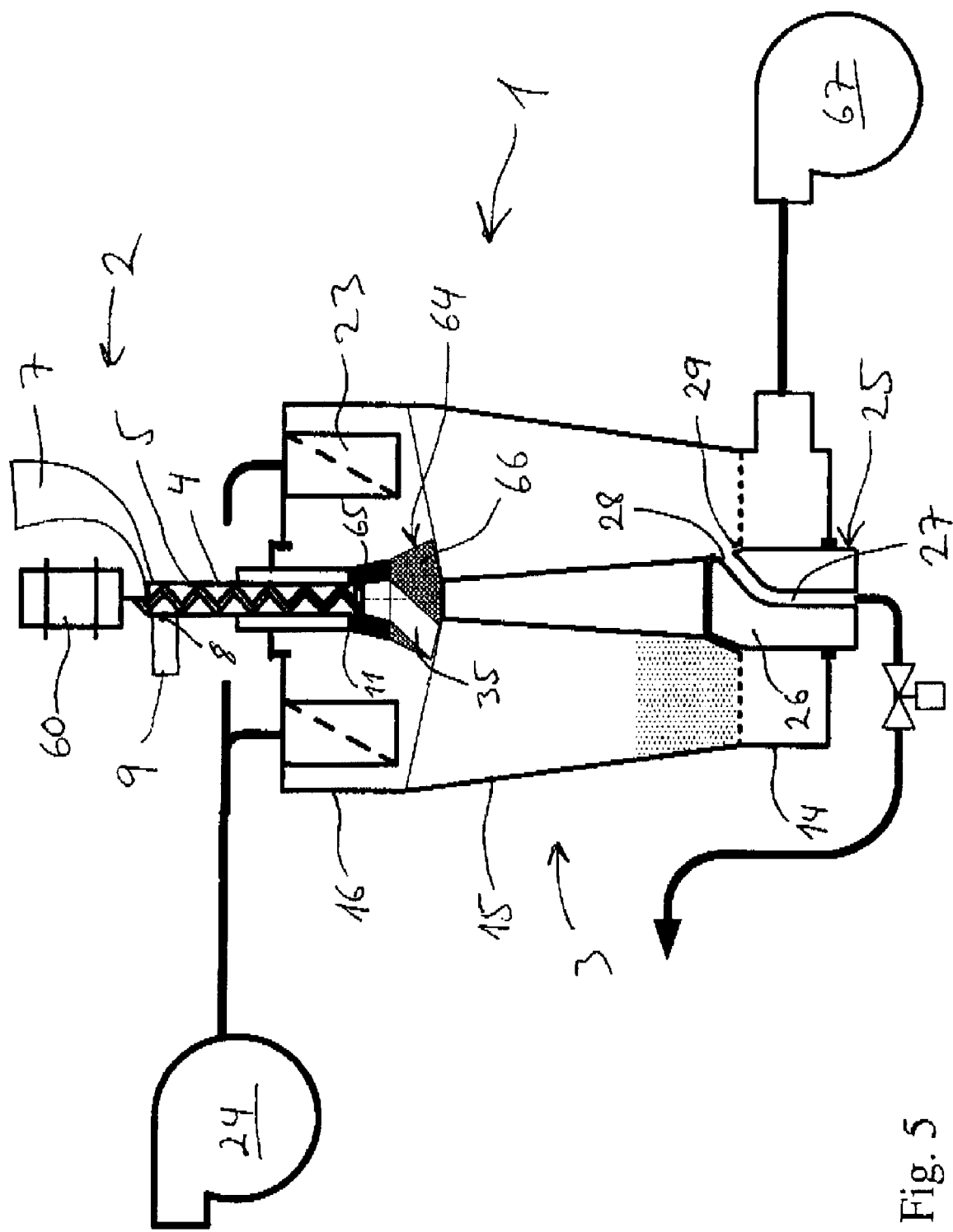

FIG. 5 shows yet another embodiment of the continuous granulating and drying apparatus 1 according to the invention. In this embodiment, the screw granulator 2 is arranged vertically; however, it may also be arranged horizontally. Alternatively to the other embodiments, in this embodiment, the granulated product supply conduit 35 of the fluid bed dryer 3 is arranged through a sonic conditioner 64 comprising a generator 66 of airwaves traveling at sonic speed. The sonic conditioner 64 is by means of a rotational coupling 65 connected with the outlet 11 for granulated product of the granulation chamber 4 of the screw granulator 2. The generator 66 of airwaves traveling at sonic speed is well known in the art and comprises an ultrasonic driving means, such as a piezoelectric transducer that is controlled by a not shown control unit.

Figure 9:
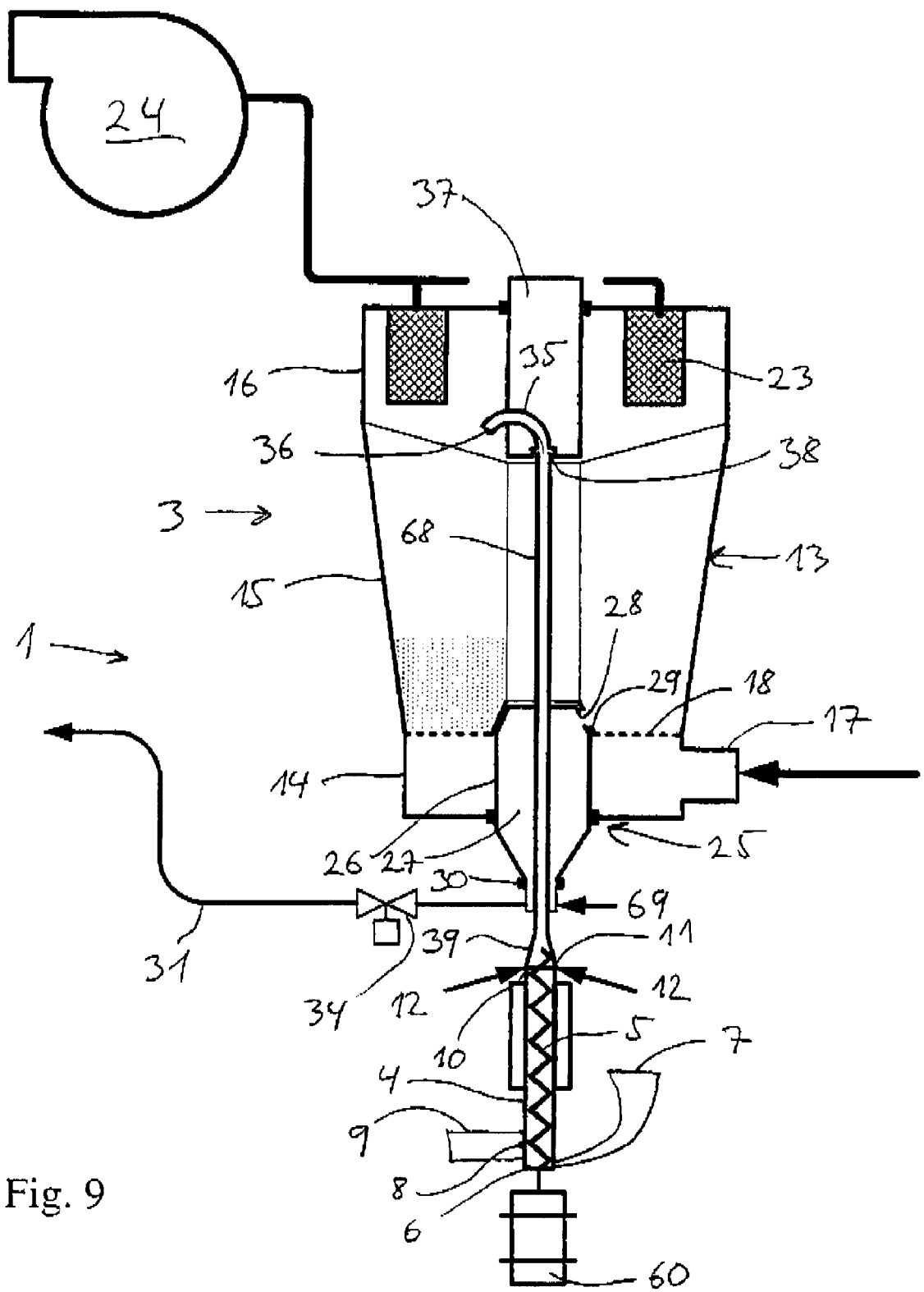

FIG. 9 shows yet another embodiment of the continuous granulating and drying apparatus 1 according to the invention. In this embodiment, the screw granulator 2 is arranged vertically below the fluid bed dryer 3; however, it may also be arranged horizontally below the fluid bed dryer 3. Alternatively to the other embodiments, in this embodiment, the rotational coupling 38 of the granulated product supply conduit 35 of the fluid bed dryer 3 is connected with a vertical supply tube 68 extending downward through the center of the common vessel 15 and through the plug 26 arranged rotatably coaxially with the common vessel 15, in order for the vertical supply tube 68 to be connected with the outlet 11 for granulated product of the granulation chamber 4 of the screw granulator 2. In this embodiment, the product discharge conduit 27 may be in the form of a cavity as it may be seen in the figure, so that the dry product may flow around the vertical supply tube 68 to the outlet tube 31. Transport air for the wet product is drawn from the transport air inlet 12, through the transition piece 39, the vertical supply tube 68, and the granulated product supply conduit 35, by maintaining the separate processing compartments at sub-atmospheric pressure. Possibly, the transition piece 39 may be omitted, if the diameter of the vertical supply tube 68 and of the granulated product supply conduit is large enough to avoid clogging of the granulated product. Furthermore, transport air for the dry product may be drawn from another transport air inlet 69 arranged at the second end opening 30 of the product discharge conduit 27 in order to facilitate transport of the dry product through the outlet tube 31. Obviously, the embodiment shown in FIG. 9 may be combined with the embodiments shown in the other figures; for instance, the transition piece 39 may be replaced by a sonic conditioner or the granulated product supply conduit 35 of the fluid bed dryer 3 may alternatively be carried out as a rotary transition piece 61, as shown in FIG. 7.

According to the invention, the apparatus 1 comprises a not shown computer adapted to control various functions and processing parameters of the apparatus, such as the speed of the rotary shafts of the granulator, the feed rate of the powder material, the binder feed rate and the feed rate and proportions of liquid, solution, suspension and gas to a binder feed pump, and data from instruments for the measurement of parameters such a moisture content, density, active component, particle size and shape of the granules are fed into the processing unit or computer. Furthermore, the computer may control the rotation of the drive motors for the fluid bed dryer, as well as operational parameters, such as flow rate and temperature of the fluidizing gas, and possibly of the temperature controlling gas, and product inlet flow, or the like, in dependence of measured parameters, such as residual moisture of product treated in the respective processing compartments of the apparatus measured by means of a near-infrared device, a microwave device or the like, placed at a not shown window arranged in a wall or through the bed plate of each processing compartment, or in any suitable way, for instance projecting from above the fluid bed in the common vessel.

What is claimed is:

1. A continuous granulating and drying apparatus for pharmaceutical products, comprising:

a granulator and a fluid bed dryer, the granulator comprising a longitudinal granulation chamber having a first end with an inlet for powder material and a binder feed port and a second end with an outlet for granulated product, the granulation chamber comprising at least one rotary shaft provided with at least one granulating element, the fluid bed dryer comprising at least two separate processing compartments forming part of a common vessel being provided with radially extending partition walls separating the processing compartments from each other, each processing compartment having a product inlet and a product outlet, the fluid bed dryer comprising a bed plate having openings for fluidizing gas and being arranged above a gas inlet, a gas outlet, a granulated product supply conduit arranged rotatably to selectively communicate with the product inlet of each separate processing compartment, respectively, a product discharge conduit arranged rotatably to selectively communicate with the product outlet of each separate processing compartment, respectively, and the granulator and the fluid bed dryer are closely coupled;

wherein the granulator and the fluid bed dryer are closely coupled by means of a housing having an inlet end mating the outlet for granulated product and an outlet end mating the product supply conduit.

2. A continuous granulating and drying apparatus according to claim 1, wherein the outlet for granulated product of the granulation chamber has a substantially larger cross-sectional dimension than the granulated product supply conduit of the fluid bed dryer, wherein the outlet for granulated product is coupled to the granulated product supply conduit by means of a transition piece comprising the housing, wherein a flexible liner having a first end and a second end that has a substantially smaller cross-sectional dimension than the first end, the circumference of the flexible liner being connected in a fluid tight manner with the housing at each end of the flexible liner, so that an annular enclosure is formed between the flexible liner and the housing, and wherein the annular enclosure communicates with a control fluid connection.

3. A continuous granulating and drying apparatus according to claim 1, wherein the outlet for granulated product of the granulation chamber is arranged above the granulated product supply conduit of the fluid bed dryer.

4. A continuous granulating and drying apparatus according to claim 1, wherein the rotatably arranged granulated product supply conduit of the fluid bed dryer comprises the housing having an inlet end and an outlet end,
wherein the housing is provided with a flexible liner having a first end and a second end, the circumference of the flexible liner being connected in a fluid tight manner with the housing at each end of the flexible liner, so that an annular enclosure is formed between the flexible liner and the housing, and wherein the annular enclosure communicates with a control fluid connection.

5. A continuous granulating and drying apparatus according to claim 4, wherein the second end of the flexible liner has a substantially smaller cross-sectional dimension than the first end of the flexible liner.

6. A continuous granulating and drying apparatus according to claim 1, wherein the granulated product supply conduit of the fluid bed dryer is a rigid tube having a substantially constant cross-sectional dimension corresponding substantially to a cross-sectional dimension of the outlet; for granulated product of the granulation chamber.

7. A continuous granulating and drying apparatus according to claim 1, wherein the distance between the rotatably arranged granulated product supply conduit of the fluid bed dryer and the outlet for granulated product of the granulation chamber is smaller than one meter.

8. A continuous granulating and drying apparatus according to claim 1, wherein the distance between the rotatably arranged granulated product supply conduit of the fluid bed dryer and the outlet for granulated product of the granulation chamber is smaller than half a meter.

9. A continuous granulating and drying apparatus for pharmaceutical products, comprising a granulator and a fluid bed dryer, the granulator comprising a longitudinal granulation chamber having a first end with an inlet for powder material and a binder feed port and a second end with an outlet for granulated product, the granulation chamber comprising at least one rotary shaft provided with at least one granulating element, the fluid bed dryer comprising at least two separate processing compartments forming part of a common vessel being provided with radially extending partition walls separating the processing compartments from each other, each processing compartment having a product inlet and a product outlet, the fluid bed dryer comprising a bed plate having openings for fluidizing gas and being arranged above a gas inlet, a gas outlet, a granulated product supply conduit arranged rotatably to selectively communicate with the product inlet of each separate processing compartment, respectively, a product discharge conduit arranged rotatably to selectively communicate with the product outlet of each separate processing compartment, respectively, and the granulator and the fluid bed dryer are closely coupled; wherein the outlet for granulated product of the granulation chamber is coupled to the granulated product supply conduit of the fluid bed dryer by means of a sonic conditioner comprising a granulated product pathway provided with a generator of airwaves traveling at sonic speed.

10. A continuous granulating and drying apparatus according to claim 9, wherein the sonic conditioner is rigidly connected with the outlet for granulated product of the granulation chamber and rotatably connected with the granulated product supply conduit of the fluid bed dryer.

11. A continuous granulating and drying apparatus according to claim 1, wherein the granulated product supply conduit of the fluid bed dryer has the form of a sonic conditioner comprising a granulated product pathway provided with a generator of airwaves traveling at sonic speed.

12. A continuous granulating and drying apparatus according to claim 1, wherein a pressure controlling supply fan is connected to the gas inlet of the fluid bed dryer.

13. A continuous granulating and drying apparatus according to claim 1, wherein the at least one rotary shaft of the granulator forms an angle of from 0 to 70 degrees with the vertical.

14. A continuous granulating and drying apparatus according to claim 1, wherein the at least one rotary shaft of the granulator forms an angle of from 0 to 70 degrees with the horizontal.

15. A continuous granulating and drying apparatus according to claim 1, wherein the granulation chamber comprises at least two parallel rotary shafts provided with granulating elements.

16. A continuous granulating and drying apparatus according to claim 1, wherein the product discharge conduit and the granulated product supply conduit of the fluid bed dryer are rotatable independently by means of two separate motors, so that the product discharge conduit and the granulated product supply conduit may communicate with different processing compartments independently of each other.

* * * * *